(12) United States Patent
Peruta

(10) Patent No.: US 7,865,906 B2
(45) Date of Patent: *Jan. 4, 2011

(54) RESOURCE MANAGEMENT WITH ACTIVE ASSOCIATIONS

(75) Inventor: Pietro Della Peruta, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/211,171

(22) Filed: Sep. 16, 2008

(65) Prior Publication Data

US 2009/0019452 A1    Jan. 15, 2009

Related U.S. Application Data

(63) Continuation of application No. 10/845,541, filed on May 13, 2004, now Pat. No. 7,441,247.

(51) Int. Cl.
*G06F 3/00* (2006.01)
*G06F 7/00* (2006.01)

(52) U.S. Cl. .................................. 719/320; 707/705

(58) Field of Classification Search .............. 719/310, 719/320; 707/1, 705
See application file for complete search history.

(56) References Cited

U.S. PATENT DOCUMENTS

| | | | |
|---|---|---|---|
| 6,397,206 B1 * | 5/2002 | Hill et al. ........................... | 1/1 |
| 6,754,664 B1 * | 6/2004 | Bush ............................ | 707/102 |
| 7,003,504 B1 * | 2/2006 | Angus et al. .......................... | 1/1 |
| 7,054,853 B2 * | 5/2006 | Johnson et al. ...................... | 1/1 |
| 2003/0105732 A1 * | 6/2003 | Kagalwala et al. .............. | 707/1 |
| 2004/0015851 A1 * | 1/2004 | Newhook et al. ............ | 717/116 |
| 2004/0095237 A1 * | 5/2004 | Chen et al. ................... | 340/506 |

OTHER PUBLICATIONS

Shekar Ramanathan, Extraction of Object-Oriented Structures from Existing Relational Database, 1997.*

* cited by examiner

*Primary Examiner*—Lechi Truong
(74) *Attorney, Agent, or Firm*—Stephen J. Walder, Jr.; Jeffrey S. LaBaw

(57) ABSTRACT

A mechanism for managing associations in the CIM model are proposed. An association is modeled by a particular class, which includes two or more references to other classes; the association is implemented by a corresponding provider. Whenever a management application (such as a performance monitor) needs to access the association, a corresponding request is transmitted to the provider. In response thereto, the provider enumerates all the resource objects instantiating the references of the association, and creates an instance of the association for any combination. The provider further sets a property of each instance of the association, according to dynamic characteristics of the corresponding resource objects. In this way, an active association is provided, allowing cross-analysis of the resource objects participating in the association.

13 Claims, 4 Drawing Sheets

US 7,865,906 B2

RESOURCE MANAGEMENT WITH ACTIVE ASSOCIATIONS

This application is a continuation of application Ser. No. 10/845,541, filed May 13, 2004, now U.S. Pat. No. 7,441,247.

TECHNICAL FIELD

The present invention relates to the data processing field, and more specifically to a method and a corresponding system for managing associations between resources.

BACKGROUND ART

Management of entities representing different types of resources (such as software applications or hardware devices) is a critical issue in a data processing system. This problem is particular acute when complex associations are established between the resources under management.

Several technologies have been proposed in the last years for organizing and structuring information (used for managing the resources) into standard models. For example, the Common Interface Model (CIM) is a specification that abstracts and describes the managed resources using an object-oriented paradigm. The CIM model is supported by a framework, which provides a uniform way for management applications to access the resources. The framework exploits providers of dynamic management services (each one acting as an intermediary between the framework and associated resources).

In the CIM model, a specific class is defined for any category of resources; each actual resource under management is represented by an instance of the corresponding class. An association is modeled by a particular class, which includes two or more references to other classes. The association is implemented by a corresponding provider; the provider enumerates all the instances of the classes involved in the association, and creates an instance of the association for any combination.

A drawback of the solution described above is that the association is defined as a completely passive object.

The structure known in the art does not provide any analysis of the resources participating in the association.

As a consequence, the burden of implementing algorithms acting on the resources of the association is completely remitted to the management applications accessing the association.

SUMMARY OF THE INVENTION

It is an object to provide a resource management mechanism that supports active associations. It is another object of the present invention to implement a cross-analysis of the resources participating in the association. It is yet another object to simplify the implementation of the management applications accessing the association.

The accomplishment of these, and other related objects, is achieved in one illustrative embodiment comprising a resource management infrastructure by mechanisms that manage an association among at least two resources, each resource being modeled by a resource class and the association being modeled by an association class including a plurality of references to the corresponding resource classes. Under the control of a corresponding provider of dynamic management services, the mechanisms receive a request from a management application and identify at least one resource object instantiating each resource class referenced in the association class. The mechanisms further create an association object instantiating the association class for each combination of the resource objects and set at least one association property of each association object according to dynamic characteristics of the corresponding resource objects. Each association object is returned to the management application.

Moreover, the illustrative embodiments provide a computer program product for implementing the mechanisms of the illustrative embodiments and a product storing the computer program product. A corresponding provider and a resource management infrastructure including the provider are also encompassed.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT

Figure 1:
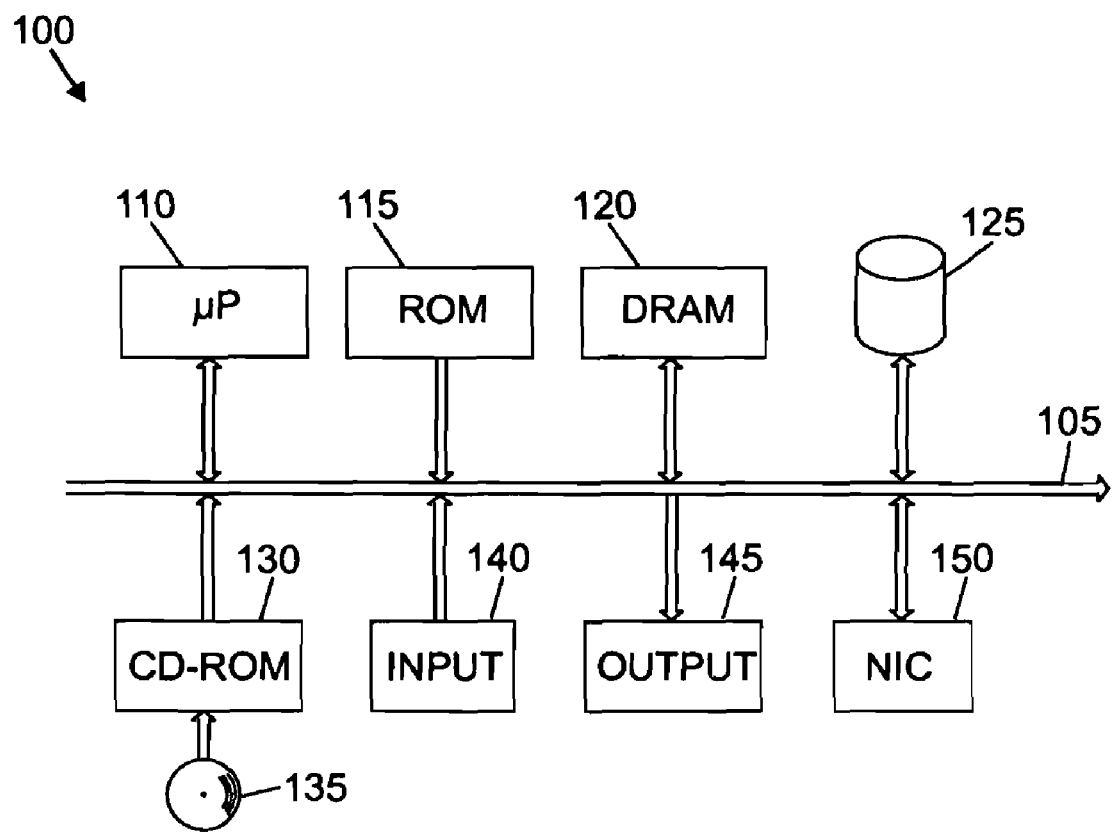
FIG. 1 is a schematic block diagram of a computer in which the method of the invention can be used.

With reference in particular to FIG. 1, a computer 100 is shown. The computer 100 is formed by several units, which are connected in parallel to a communication bus 105. In detail, a microprocessor (μP) 110 controls operation of the computer 100, a Read Only Memory (ROM) 115 stores basic code for a bootstrap of the computer 100, and a DRAM 120 is directly used as a working memory by the microprocessor 110. Several peripheral units are further connected to the bus 105 (by means of respective interfaces). Particularly, a mass memory consists of a magnetic hard-disk 125 and a driver 130 for reading CD-ROMs 135. Moreover, the computer 100 includes input devices 140 (for example, a keyboard and a mouse), and output devices 145 (for example, a monitor and a printer). A network Interface Card (NIC) 150 is used to connect the computer 100 to a network, typically the INTERNET.

However, the concepts of the present invention are also applicable when the computer has a different structure or includes other units, when the computer is replaced with an equivalent data processing system (for example, consisting of a network of workstations), and the like.

Figure 2:
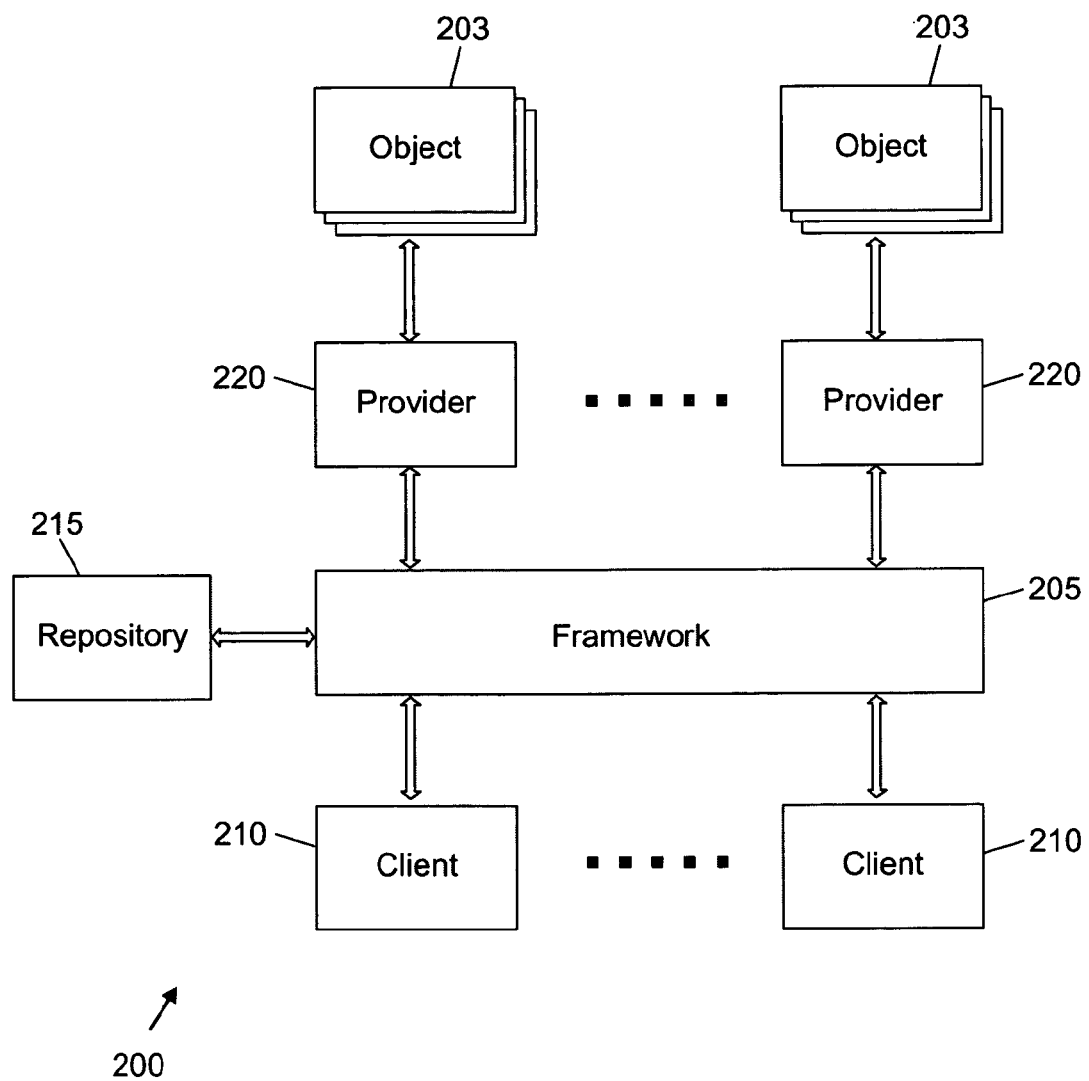
FIG. 2 shows a partial content of a working environment hosting an implementation of the proposed solution.

Considering now FIG. 2, a partial content of the working memory of the computer in operation is shown; the information (programs and data) is typically stored on the hard-disk and loaded (at least partially) into the working memory when the programs are running, together with an operating system and other application programs (not shown in the figure). The programs are initially installed onto the hard disk from CD-ROM.

The computer implements an infrastructure 200 for managing several kinds of physical or logical resources; for example, the resources are stand-alone programs, client-server applications, INTERNET-based services, other computers, hardware devices, controllers, people, organizations, and the like. Each resource is instrumented to enable access to corresponding information (such as data, events and status). For this purpose, the resource is modeled as an object conforming to the CIM specification (as common usage in the object-oriented literature, the word object is used in some cases to refer to either a class or an instance thereof).

The CIM model implements a standard information schema with a basic set of classes, properties and methods; for this purpose, the CIM model provides a meta-schema, which defines a common vocabulary used to describe those objects. The structure and the content of each object are described in the Managed Object Format (MOF). The MOF syntax supports keywords (known as qualifiers), which are enclosed between brackets before a class or property declaration; each qualifier consists of a name/value pair that describes and characterizes the class or property. A particular qualifier "Key" is used to reference objects 203 consisting of specific instances of a class (each one representing an actual resource under management); particularly, the resource objects 203 are named by concatenating the values of all the properties of the class that are qualified by "Key" (which concatenation defines a so-called modelname).

The resource management infrastructure 200 implementing the CIM model is typically based on the Windows Management Instrumentation (WMI) architecture. The WMI architecture includes a framework 205 (known as CIM Object Manager, or CIMOM); the framework 205 provides a uniform way for management applications (or WMI clients) 210 to access the resource objects 203 (irrespective of their implementation). For this purpose, the framework 205 exposes an interface "IWbemServices", which defines a series of methods that can be called by the clients 210. For example, the framework 205 allows the clients 210 to create, delete, and manipulate the resource objects 203; moreover, the framework 205 supports event notification and query-based data retrieval.

The framework 205 interfaces with a WMI repository 215. The repository 215 stores static management data. Management data in the repository 215 is organized in logic collections (schema), which are loaded into corresponding namespaces; a namespace provides a domain (or container) for a schema and for the instances of the classes in that schema. The namespace path and its modelname unambiguously specify each resource object 203.

The framework 205 further exploits one or more WMI providers 220 of dynamic management services. Each provider 220 acts as an intermediary between the framework 205 and associated resource objects 203. The provider 220 manages dynamic data relating to the resource objects 203 (which data is not available in the repository 215); in addition, the provider 220 implements notification of events that are not supported by the framework 205. Information about which provider 220 to contact for dynamic data or event notifications is stored in the repository 215. Particularly, a class whose instances are created dynamically is denoted preceding its declaration with a qualifier "Provider"; the value of the qualifier "Provider" is the name of the provider 220 associated with all the objects instantiating that class.

The CIM model also supports the definition of associations. An association is a particular type of class, which is used to represent a relationship between resource objects 203. For this purpose, the definition of the association must include two or more references. Each reference specifies the role of a corresponding class in the context of the association. The number of references defines the cardinality of the association; an association with two references is a binary association, an association with three references is a ternary association, and so on.

An association is denoted preceding its declaration with a qualifier "Association". Each reference consists of a property that defines a pointer to the corresponding class involved in the association; the reference is declared indicating the name of the class, which is followed by the keyword "Ref" and the name of the reference. Optionally, the declaration of the reference includes one or more qualifiers specifying its cardinality; the cardinality of the reference is denoted combining the values of the qualifiers Min( ) and Max( ). Additional properties and methods supported by the association are defined in the same way as for ordinary classes.

The association is implemented enumerating the objects that instantiate each reference. An object instantiating the association is created for any combination of the reference objects (with the association object that includes pointers to those objects).

For example, let us consider an association "AssociationClass" between the class "ClassA" (having an antecedent role) and the class "ClassB" (having a dependent role), which association is supported by a provider "AssociationProvider"; the association is defined by the following file "AssociationClass.mof":

```
[Association, Provider("AssociationProvider")]
class AssociationClass
{
ClassA Ref Antecedent;
ClassB Ref Dependent
}
```

The classes "ClassA" and "ClassB" are in turn defined by the following files "ClassA.mof" and "ClassB.mof", respectively:

```
class ClassA
{
[Key]
string KeyA
};
class ClassB
{
[Key]
string KeyB
}
```

Let us assume that an object "KeyA=MyKeyA$_1$" instantiates the class "ClassA" and that two objects "KeyB=MyKeyB$_1$" and "KeyB=MyKeyB$_2$" instantiate the class "ClassB"; in this case, two association objects "KeyA=MyKeyA$_1$; KeyB=MyKeyB$_1$" and "KeyA=MyKeyA$_1$; KeyB=MyKeyB$_2$" will be created.

However, the concepts of the present invention are also applicable when an equivalent resource management infrastructure is implemented (even without any framework), when a different number of providers is encompassed (down to a single one), or when the resource management infrastructure is based on a similar model. The same considerations apply if the CIM models are expressed with another syntax (for example, using the Extensible Markup Language, or XML), and the like.

Figure 3:
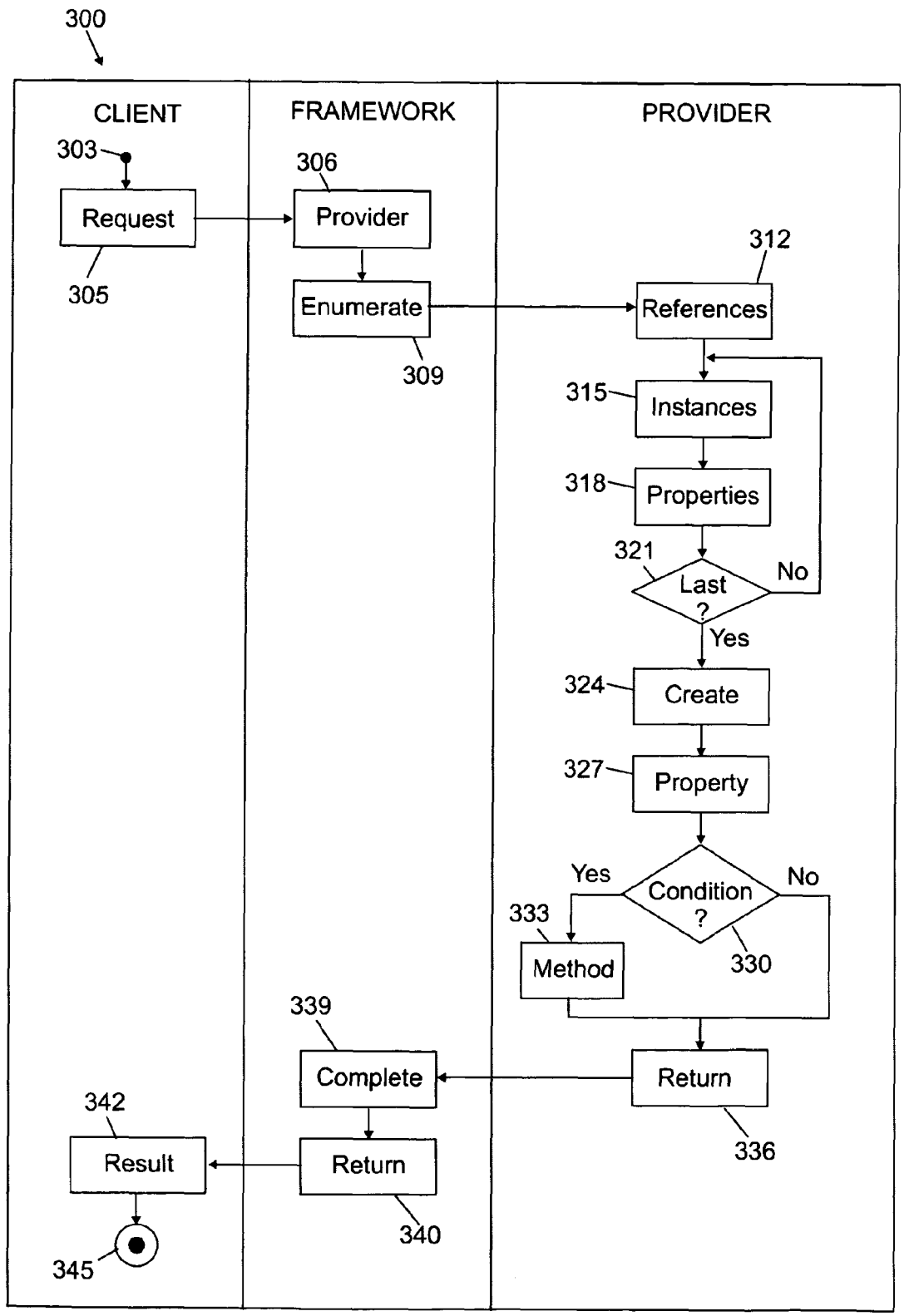
FIG. 3 describes the flow of activities of a resource management process.

Moving now to FIG. 3, the flow of activities of a generic resource management process 300 begins at the black start circle 303 in the swim-lane of a client. Whenever the client needs to perform some operations on the resource objects, a corresponding method exposed by the interface "IWbemServices" of the framework is called at block 305. If the operation only involves static management data that is held in the repository, the framework processes the request directly. Conversely, the framework at block 306 inspects the relevant class in the repository to identify the provider to be exploited. Assuming that the request relates to an association, a corresponding request for enumerating the objects implementing the association is transmitted to the provider at block 309.

Considering now block 312 in the swim-lane of the provider, the association is inspected to identify its references. For each reference (starting from the first one), the objects instantiating the reference are enumerated at block 315. The process continues to block 318, wherein every property of the reference objects is evaluated. A test is made at block 321 to verify whether all the references have been processed. If not, the flow of activities returns to block 315 in order to enumerate the objects of a next reference.

Conversely, the method descends into block 324, wherein an object instantiating the association is created for each combination of the reference objects. Proceeding to block 327, one or more properties of each association object are set; the operation is based on an algorithm (defined inside the provider), which calculates the property from the values of the properties exposed by the corresponding reference objects. The process branches at block 330 according to the value of the property of the association object. If the property is indicative of a condition requiring some predefined actions, one or more corresponding methods exposed by the association object are called at block 333; the process then passes to block 336. Conversely, the flow of activities descends into block 336 directly.

With reference now to block 336, the result of the enumeration on the association (and any exceptions thereof) is returned to the framework. The operation requested by the client in completed at block 339 in the swim-lane of the framework (if necessary). The result of the request is returned to the client at block 340. The client receives the result at block 342, and the process then ends at the concentric white/black stop circles 345.

Figure 4:
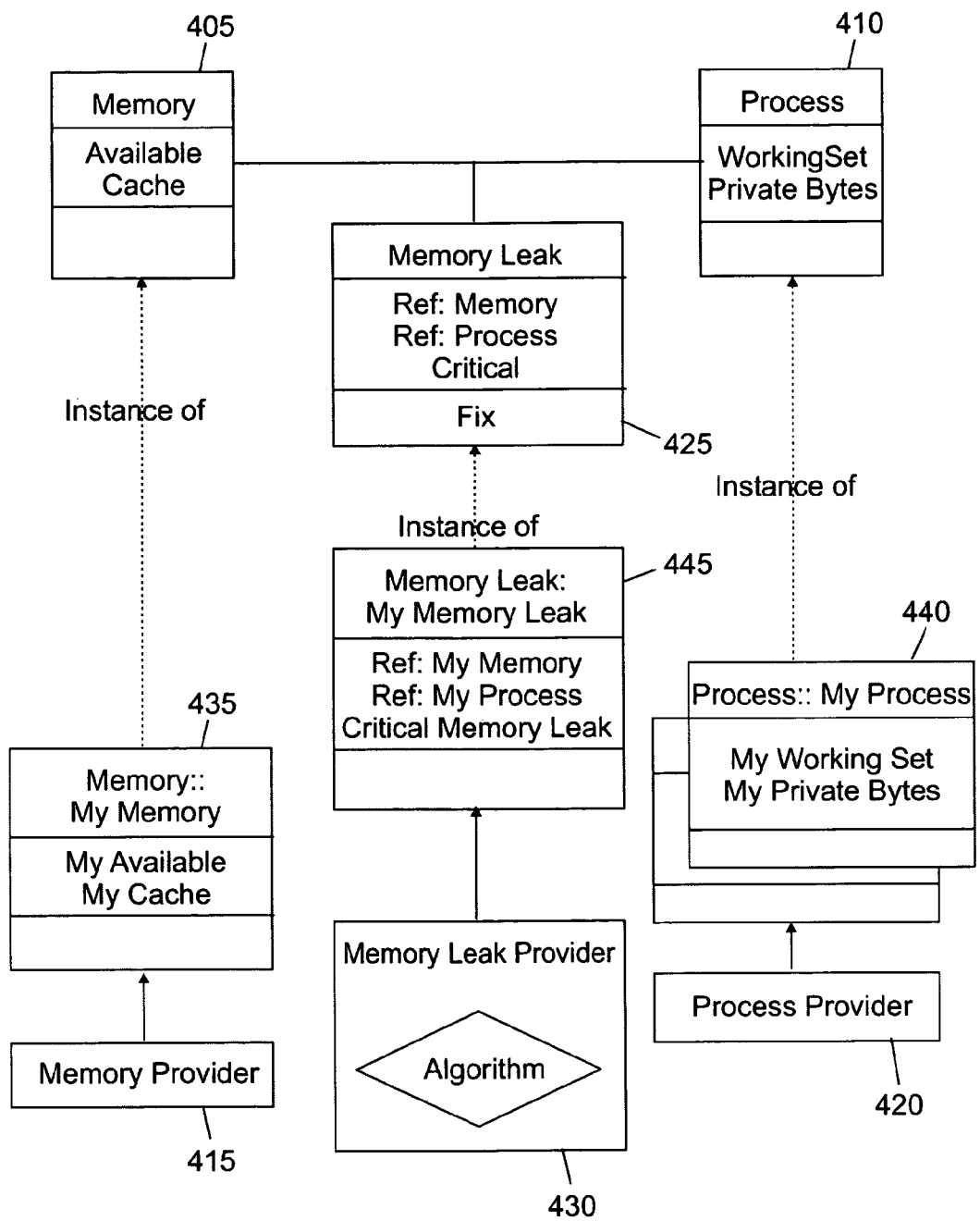
FIG. 4 is a class diagram illustrating an example of association.

As shown in FIG. 4, the solution described above is applied in a performance monitor to model resource bottlenecks. For example, the performance monitor is used to detect a critical leak in the working memory of the computer. For this purpose, a class "Memory" 405 and a class "Process" 410 are defined in the repository. A provider "MemoryProvider" 415 is associated with the class "Memory" 405, and a provider "ProcessProvider" 420 is associated with the class "Process" 410.

The class "Memory" 405 is used to model the (working) memory of the computer; the class "Memory" 405 has a property "Available", which indicates the residual capacity of the memory in the computer, and a property "Cache", which indicates the amount of memory configured as a cache. The class "Process" 410 is used to model each process running on the computer. A property "WorkingSet" indicates the total memory used by the process, and a property "PrivateBytes" indicates the amount of memory completely dedicated to the process.

An association "MemoryLeak" 425 is defined with a reference to the class "Memory" 405 and a reference to the class "Process" 410. The association "MemoryLeak" 425 has a property "Critical", which indicates a memory leak involving a critical condition on the computer. Moreover, the association "MemoryLeak" 425 exposes a method "Fix"; this method implements actions for self-resolving the critical memory leak condition. The association "MemoryLeak" 425 is managed by a corresponding provider "MemoryLeakProvider" 430.

Whenever the condition of the memory must be verified, the performance monitor calls a method "createInstanceEnumAsync" on the framework (passing the name of the association "MemoryLeak" 425 as a parameter); this method creates an enumerator that asynchronously supplies the instances of the association "MemoryLeak" 425; the method returns immediately after being called so that the framework can continue its execution while the request is pending.

In response thereto, the framework inspects the definition of the association "MemoryLeak" 425, in order to identify the corresponding provider "MemoryLeakProvider" 430. A method "createInstanceEnum" is then called on the provider "MemoryLeakProvider" 430 for enumerating the instances of the association "MemoryLeak" 425 in a synchronous manner. The provider "MemoryLeakProvider" 430 in turn inspects the definition of the association "MemoryLeak" 425, so as to identify the corresponding references. For each reference ("Memory" 405 and "Process" 410), the provider "MemoryLeakProvider" 430 inspects its definition for identifying the corresponding provider ("MemoryProvider" 415 and "ProcessProvider" 420, respectively); the instances of the class "Memory" 405 and the instances of the class "Process" 410 are enumerated calling the method "createInstanceEnum" on the provider "MemoryProvider" 415 and on the provider "ProcessProvider" 420, respectively. For example, an object "MyMemory" 435 instantiates the class "Memory" 405, and one or more objects "MyProcess" 440 instantiate the class "Process" 410. An object "MyMemoryLeak" 445 is created with pointers to the reference objects "MyMemory" 435 and "MyProcess" 440.

The provider "MemoryLeakProvider" 430 then detects the residual capacity of the memory from the value of the property "Available" and the amount of memory configured as a cache from the value of the property "Cache" (in the reference object "MyMemory" 435); for this purpose, the method "GetProperty" is called on the reference object "MyMemory" 435 passing the name of the desired property as a parameter. Moreover, the provider "MemoryLeakProvider" 430 detects the memory used by each process from the property "WorkingSet" (in the corresponding reference object "MyProcess" 440); the total extension of the working sets ("TotalWS") is calculated summing the properties "WorkingSet" of all the reference objects "MyProcess" 440:

$$TotalWS = \Sigma WorkingSet$$

The memory actually in use ("TotalRAM") is calculated summing the property "Available", the property "Cache" and the value "TotalWS":

$$TotalRAM = Available + Cache + TotalWS$$

The result of the operations described above are further elaborated, in order to calculate the percentages of each component "Available", "Cache" and "TotalWS" over the value "TotalRAM" (denoted with "PerAvailable", "PerCache" and "PerTotalWS", respectively):

$$PerAvailable = (Available/TotalRAM)*100$$

$$PerCache = (Cache/TotalRAM)*100$$

$$PerTotalWS = (TotalWS/TotalRAM)*100$$

A low available memory with high working sets is detected when:

PerTotalWS>PerCache AND
PerTotalWS>PerAvailable

If both conditions are true, a corresponding flag "LowAvailableMemory" is asserted.

Moreover, the provider "MemoryLeakProvider" 430 detects the amount of memory completely dedicated to each process from the property "PrivateBytes" (in the corresponding reference object "MyProcess" 440). An increase of the memory completely dedicated to the process is detected when the current value of the property "PrivateBytes" is greater than its previous value. In this case, a further flag "PrivateMemoryLeak" is asserted.

The computer is deemed to experience a critical memory leak when a low available memory with high working sets and an increase of the memory completely dedicated to a process are detected (flags "LowAvailableMemory" and "PrivateMemoryLeak" asserted). If both conditions are true, the provider "MemoryLeakProvider" 430 asserts the property "Critical". For this purpose, a method "PutProperty" is called on the association object "MyMemoryLeak" 445 passing the name of the property and its desired value. The assertion of the property "Critical" triggers the execution of the method "Fix" (invoked through a method "ExecMethod" called on the association object "MyMemoryLeak" 445). The method "Fix" involves the execution of predefined actions trying to self-resolve the detected critical memory leak condition (for example, aborting the process whose property "PrivateBytes" is increasing).

However, the concepts of the present invention are also applicable when the critical condition is detected in a different way, or when the monitoring application operates on other resources (for example, a network). Similar considerations apply if the process implements an equivalent method, or if additional functions are provided. Alternatively, the association objects and/or the resource objects are enumerated in a different way, two or more properties are set in each association object, two or more methods are called in response to the property(ies) of the association object, and the like.

More generally, the present invention proposes a method for use in a resource management infrastructure. The method involves the management of an association among at least two resources. Each resource is modeled by a resource class; the association is modeled by an association class including a plurality of references to the corresponding resource classes. The method includes a series of steps, which are executed under the control of a corresponding provider of dynamic management services. The method starts with the step of receiving a request from a management application. One or more resource objects instantiating each resource class referenced in the association class are identified. An association object instantiating the association class is created for each combination of the resource objects. The method continues setting one or more association properties of each association object, according to dynamic characteristics of the corresponding resource objects. The method then ends with the step of returning each association object to the management application.

The proposed solution provides a resource management method that supports active associations.

The method of the invention implements a cross-analysis of the resources participating in the association.

As a consequence, any management application accessing the association is relieved of the burden of providing algorithms acting on the resources of the association; therefore, their implementation is strongly simplified (with the algorithm that is defined in the active association directly).

The preferred embodiment of the invention described above offers further advantages.

Particularly, each property of the association is calculated according to one or more properties of the corresponding reference objects.

As a consequence, the definition of the algorithm implemented in the provider is further simplified.

A way to improve the solution is to execute one or more predefined actions on the association in response to its property.

The proposed feature provides an autonomic approach, which allows the resources participating in the association to self-configure.

A suggested choice for implementing the predefined actions is to call one or more methods exposed by the association.

In this way, the behavior of the resources under management is completely encapsulated in the corresponding association.

However, the solution according to the present invention leads itself to be put into practice even setting the property of the association according to different dynamic characteristics of the reference objects (for example, in response to the results of methods called on the reference objects); alternatively, the predefined actions are directly implemented by the provider, or no actions responsive to the property of the association object are supported.

The proposed solution is specifically designed for a resource management infrastructure conforming to the CIM specification (or to equivalent models); however, the use of the method of the invention in alternative models is not excluded.

Without detracting from its general applicability, the devised solution is particularly advantageous in a monitoring application.

The method of the invention allows the use of proactive and lightweight monitoring agents. Moreover, any critical condition can be detected and fixed without any human being intervention; as a consequence, the proposed structure automatically prevents any performance degradation caused by the critical condition.

However, the solution according to the invention is also suitable to be used in different applications (for example, in a workflow management application).

Advantageously, the method of the invention is implemented with a computer program, which is provided as a corresponding product stored on a suitable medium.

Alternatively, the program is pre-loaded onto the harddisk, is sent to the computer through a network (typically the INTERNET), is broadcast, or more generally is provided in any other form directly loadable into a working memory of the computer. However, the method according to the present invention leads itself to be carried out even with a hardware structure (for example, integrated in a chip of semiconductor material).

Naturally, in order to satisfy local and specific requirements, a person skilled in the art may apply to the solution described above many modifications and alterations all of which, however, are included within the scope of protection of the invention as defined by the following claims.

The invention claimed is:

1. An apparatus for managing an association among at least two resources, each resource being modeled by a resource class and the association being modeled by an association class including a plurality of references to the corresponding resource classes, the apparatus comprising:

a processor; and a memory coupled to the processor, wherein the memory comprises instructions which, when executed by the processor, cause the processor to:

receive a request from a management application;

identify at least one resource object, in memory of a data processing system, instantiating each resource class referenced in the association class;

create an association object, in the memory of the data processing system, instantiating the association class for each combination of the resource objects;

set at least one association property of each association object according to dynamic characteristics of the corresponding resource objects by:

evaluating at least one resource property of each resource object in the association object; and calculating the at least one association property according to the corresponding at least one resource property;

return each association object to the management application; and manage, by the management application, at least one resource of the data processing system, associated with the at least one resource object, based on the at least one association property of an association object corresponding to the at least one resource; and execute at least one predefined action on each association object based on the corresponding at least one association property.

2. The apparatus according to claim 1, wherein the association class exposes at least one method, and wherein the instructions further cause the processor to execute the at least one predefined action by calling the at least one method on the association object.

3. The apparatus according to claim 1, wherein, under the control of a framework for allowing the management application to access the resources, the instructions further cause the processor to:

receive the request from the management application;

inspect the association class to identify the corresponding provider;

route the request to the provider;

receive each association object from the provider; and return each association object to the management application.

4. The apparatus according to claim 1, wherein the management application is a monitoring application for monitoring the resources, the at least one association property being indicative of a critical condition for the corresponding resource objects and the at least one predefined action being effective to self-resolve the critical condition.

5. The apparatus of claim 1, wherein the resource classes comprise a Memory class and a Process class, wherein the Memory class models a memory of the data processing system and the Process class models at least one process running on the data processing system.

6. An apparatus for managing an association among at least two resources, each resource being modeled by a resource class and the association being modeled by an association class including a plurality of references to the corresponding resource classes, the apparatus comprising:

a processor; and a memory coupled to the processor, wherein the memory comprises instructions which, when executed by the processor, cause the processor to:

receive a request from a management application;

identify at least one resource object, in memory of the data processing system, instantiating each resource class referenced in the association class;

create an association object, in the memory of the data processing system, instantiating the association class for each combination of the resource objects;

set at least one association property of each association object according to dynamic characteristics of the corresponding resource objects;

return each association object to the management application; and manage, by the management application, at least one resource of the data processing system, associated with the at least one resource object, based on the at least one association property of an association object corresponding to the at least one resource, wherein:

the resource classes comprise a Memory class and a Process class, the Memory class models a memory of the data processing system and the Process class models at least one process running on the data processing system, the Memory class has an Available property indicating a residual capacity of the memory of the data processing system and a Cache property indicating an amount of memory configured as a cache memory, and the Process class has a WorkingSet property that indicates a total memory used by the at least one process and a PrivateBytes property that indicates an amount of memory completely dedicated to the at least one process.

7. The apparatus of claim 6, wherein the association class is a MemoryLeak association class that references the Memory class and the Process class and has a Critical property that indicates a critical memory leak condition on the data processing system.

8. The apparatus of claim 7, wherein the MemoryLeak association class exposes a Fix method that implements one or more actions for self-resolving the critical memory leak condition.

9. An apparatus for managing an association among at least two resources, each resource being modeled by a resource class and the association being modeled by an association class including a plurality of references to the corresponding resource classes, the apparatus comprising:

a processor; and a memory coupled to the processor, wherein the memory comprises instructions which, when executed by the processor, cause the processor to:

receive a request from a management application;

identify at least one resource object, in memory of the data processing system, instantiating each resource class referenced in the association class;

create an association object, in the memory of the data processing system, instantiating the association class for each combination of the resource objects;

set at least one association property of each association object according to dynamic characteristics of the corresponding resource objects;

return each association object to the management application; and manage, by the management application, at least one resource of the data processing system, associated with the at least one resource object, based on the at least one association property of an association object corresponding to the at least one resource, wherein:

the resource classes comprise a Memory class and a Process class, the Memory class models a memory of the data processing system and the Process class models at least one process running on the data processing system, the Memory class has an Available property indicating a residual capacity of the memory of the data processing system and a Cache property indicating an amount of memory configured as a cache memory, the Process class has a WorkingSet property that indicates a total memory used by the at least one process and a PrivateBytes property that indicates an amount of memory completely dedicated to the at least one process, the association class is a MemoryLeak association class that references the Memory class and the Process class and has a Critical property that indicates a critical memory leak condition on the data processing system, the MemoryLeak association class exposes a Fix method that implements one or more actions for self-resolving the critical memory leak condition, the instructions cause the processor to identify at least one resource object instantiating each resource class reference in the association class by identifying at least one Memory object instantiating the Memory class and at least one Process object instantiating the Process class, and wherein the instructions cause the processor to set at least one association property of each association object by:

determining an amount of residual capacity of the memory from a value of the Available property of the at least one Memory object;

determining an amount of memory configured as cache memory from a value of the Cache property;

determining an amount of memory used by the at least one process running on the data processing system from a value of the WorkingSet property; and calculating an amount of memory actually in use based on the amount of residual capacity of the memory, the amount of memory configured as cache memory, and the amount of memory used by the at least one process.

10. The apparatus of claim 9, wherein the instructions further cause the processor to:

detect a low available memory condition in response to the amount of memory used by the at least one process being greater than the amount of memory configured as cache memory and the amount of memory used by the at least one process being greater than the amount of residual capacity; and set a first flag in response to detecting the low available memory condition.

11. The apparatus of claim 10, wherein the instructions further cause the processor to:

determine an amount of memory completely dedicated to the at least one process from a value of the PrivateBytes property;

detect an increase of memory completely dedicated to the at least one process in response to a current value of the PrivateBytes property being greater than a previous value of the PrivateBytes property; and set a second flag in response to detecting an increase of memory completely dedicated to the at least one process.

12. The apparatus of claim 11, wherein the instructions further cause the processor to:

detect a critical memory leak condition in response to the setting of both the first flag and second flag; and set a value of the Critical property in response to detecting the critical memory leak condition.

13. The apparatus of claim 12, wherein the instructions further cause the processor to trigger execution of the Fix method in response to setting the value of the Critical property.

* * * * *